US009825911B1

(12) United States Patent
Brandwine

(10) Patent No.: US 9,825,911 B1
(45) Date of Patent: Nov. 21, 2017

(54) SECURITY POLICY CHECK BASED ON COMMUNICATION ESTABLISHMENT HANDSHAKE PACKET

(71) Applicant: AMAZON TECHNOLOGIES, INC., Seattle, WA (US)

(72) Inventor: Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 14/944,943

(22) Filed: Nov. 18, 2015

(51) Int. Cl.
*H04L 29/06* (2006.01)
*H04L 29/12* (2006.01)

(52) U.S. Cl.
CPC ...... *H04L 63/0236* (2013.01); *H04L 61/2503* (2013.01); *H04L 63/10* (2013.01); *H04L 63/20* (2013.01); *H04L 65/1069* (2013.01)

(58) Field of Classification Search
CPC .................................................. H04L 63/0236
See application file for complete search history.

(56) References Cited

U.S. PATENT DOCUMENTS

| 7,451,489 | B2* | 11/2008 | Cantrell ................. H04L 43/00 709/224 |
| 7,823,194 | B2* | 10/2010 | Shay ........................ H04L 63/02 726/13 |
| 7,865,586 | B2* | 1/2011 | Cohn ................. H04L 41/0803 709/203 |
| 8,566,932 | B1* | 10/2013 | Hotta ...................... G06F 11/00 726/2 |
| 8,635,695 | B2* | 1/2014 | Zuk ..................... H04L 63/0254 713/151 |
| 9,154,484 | B2* | 10/2015 | Wing ....................... H04L 63/08 |
| 9,420,002 | B1* | 8/2016 | McGovern .............. H04L 63/10 |
| 9,436,820 | B1* | 9/2016 | Gleichauf |
| 9,497,164 | B2* | 11/2016 | Harp ................. G06F 17/30867 |
| 2002/0042875 | A1* | 4/2002 | Shukla ............. H04L 29/12009 713/151 |
| 2004/0042470 | A1* | 3/2004 | Cooper ................. H04L 41/046 370/401 |
| 2005/0160289 | A1* | 7/2005 | Shay ....................... H04L 63/02 726/5 |
| 2006/0098649 | A1* | 5/2006 | Shay .................... H04L 63/102 370/389 |

(Continued)

*Primary Examiner* — Ali Shayanfar
(74) *Attorney, Agent, or Firm* — Blank Rome LLP

(57) ABSTRACT

Systems and methods are disclosed that make security policy decisions based on a packet of a communication establishment handshake. The packet is intercepted and provided to a policy manger. If a security check fails, the communication session is not permitted to be established. In one example, the system includes network device (e.g., a network address translator) and a policy manager. The network address translator can receive Transmission Control Protocol (TCP) communication session establishment handshake packets and redirect each packet that is part of the TCP handshake to the policy manager rather than to the computing node targeted by the packet. The policy manager prevents the redirected packet from being forwarded to a targeted computing node in the provider network to thereby disallow the communication session from being established based on a comparison of at least information in a header of the packet to a set of security policies.

18 Claims, 10 Drawing Sheets

(56) References Cited

U.S. PATENT DOCUMENTS

| | | | |
|---|---|---|---|
| 2007/0204341 A1* | 8/2007 | Rand | H04L 51/12 |
| | | | 726/22 |
| 2008/0130900 A1* | 6/2008 | Hsieh | H04L 63/145 |
| | | | 380/278 |
| 2008/0224903 A1* | 9/2008 | Samuels | H03M 7/3084 |
| | | | 341/51 |
| 2008/0229025 A1* | 9/2008 | Plamondon | G06F 12/0862 |
| | | | 711/126 |
| 2011/0320589 A1* | 12/2011 | Hietala | H04L 63/0245 |
| | | | 709/224 |

* cited by examiner

SECURITY POLICY CHECK BASED ON COMMUNICATION ESTABLISHMENT HANDSHAKE PACKET

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

However, as the scale of data centers and compute resources provided by service providers have increased, the task of monitoring and ensuring security becomes increasingly more problematic. The amount of communication connections and data traffic into and out of a service provider's network can be voluminous and, therefore, malfeasors and malicious activity may be difficult to detect. A malfeasor may attempt to perform any of a variety of illicit actions such as scanning for networks, stealing data, corrupting data, etc.

BRIEF DESCRIPTION OF THE DRAWINGS

For a detailed description of various examples, reference will now be made to the accompanying drawings in which.

DETAILED DESCRIPTION

Figure 1:
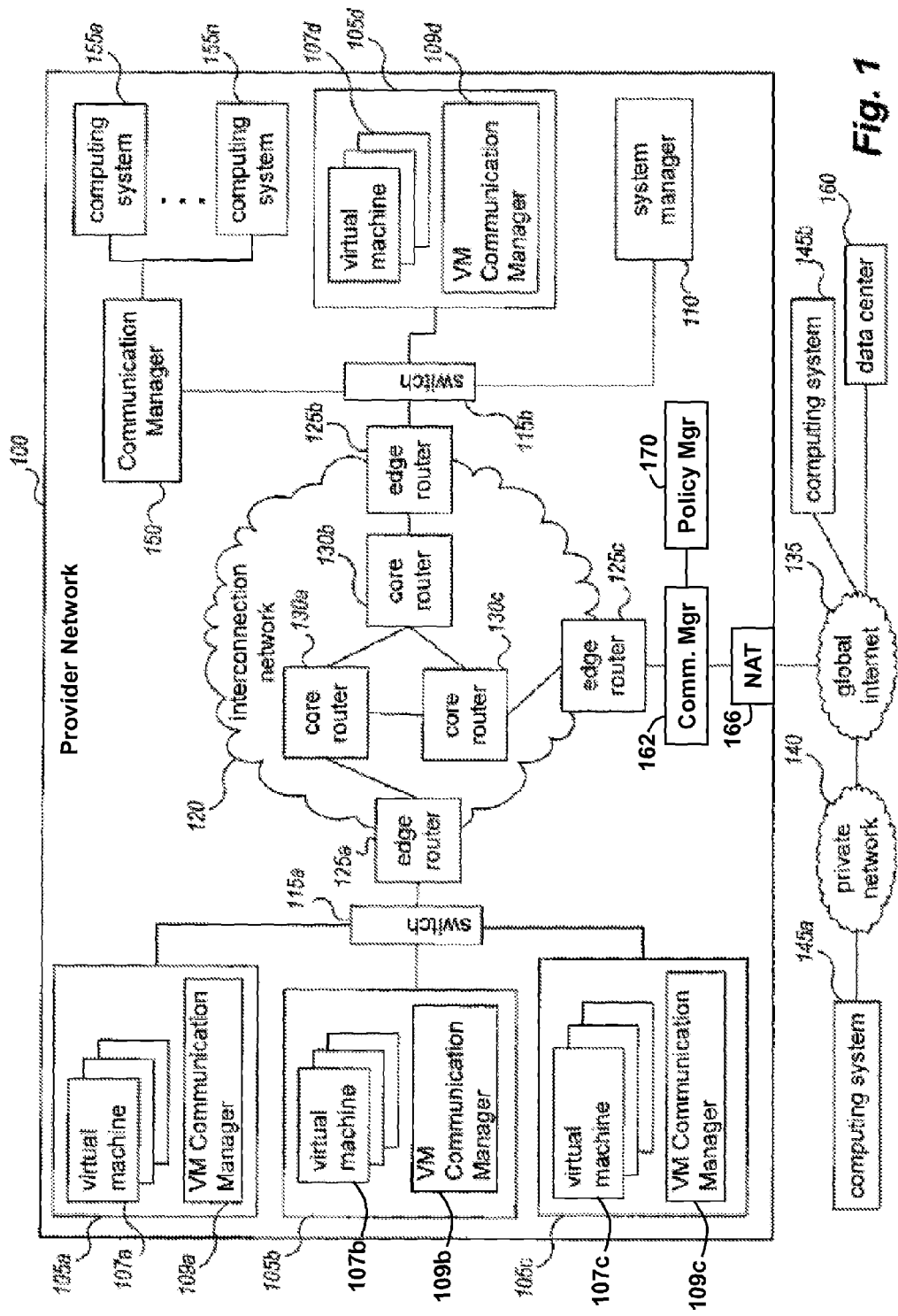
FIG. 1 is a network diagram illustrating an example embodiment for intercepting a session establishment handshake packet and making a decision as to whether to allow or reject the session.

Various embodiments are described for intercepting a communication session handshake packet targeting a particular computing node for an attempted establishment of a communication session, forwarding the packet to a policy manager, and making a decision by the policy manager as to whether to disallow the communication session from being established based on various policies. After establishment of the communication session by performing a multi-packet handshake protocol, multiple packets may be passed back and forth between two nodes in a network. The handshake may involve at least two packets, and for some handshakes, more than two packets. In one example, the communication session is a Transmission Control Protocol (TCP) session, although other protocols that are initiated with a multipacket handshake are possible as well. A TCP session is established by way of a three-way handshake. A network node initiates the TCP session with a "SYN" packet, and a destination node replies with a SYN-ACK packet. Finally, the originating node sends an ACK packet back. Through the use of these three packets, the two nodes are able to exchange initial sequence numbers, which are used subsequently during normal packet exchange within the communication session.

In some embodiments, a service provider offers access to its network of computers, storage and other resources to customers of a provider network. Customers may register accounts with the service provider's network and purchase whatever compute resources they need to support their operations. For example, an organization such as a business may have its software systems hosted on the service provider's network rather than owning and operating their own physical servers, switches, storage devices, etc. In some embodiments, a computing system external to the service provider's network of computing nodes may attempt to initiate a TCP session with a computing node internal to the service provider's network. Incoming packets to the network may include a public internet protocol (IP) address of a destination node within the service provider's network. The incoming packet may be received by a network device such as a network address translator (NAT) that translates the public source IP address to a private IP address of the destination node targeted by the packet. That is, addressing within the service provider's network may use private IP address not known or usable by external systems, and the NAT provides the appropriate address translations. Embodiments are described herein as to a NAT receiving and forwarding session establishment handshake packets to a policy manager, but the principles apply to any type of network device that performs network address translation, packet rate limiting, packet metering, firewalling, packet filtering, and the like.

The packets the NAT receives may include communication session establishment handshake packets (i.e., handshake packets that cooperate to initiate a communication session such as a TCP session) and non-communication session establishment handshake packets (e.g., normal data packets transmitted during and as part of a session). As such, for an attempt to establish a TCP session initiated by an external computing system targeting a computing node internal to the service provider's network, the NAT receives the initial incoming packet of the attempt to establish the TCP session. The initial packet of the TCP three-way handshake includes a TCP header in which the SYN flag is set. Such a packet is referred to herein as a SYN packet. The NAT receives the SYN packet and, upon determining that the SYN flag is set to a logic 1 (with the ACK flag cleared), forwards the SYN packet to a policy manager. The policy manager includes various black list security policies which define SYN packets that are to be disallowed. A detail discussion of the black list policies is provided below, but in one example, a certain IP address may be deemed untrustworthy and thus a policy may be that any SYN packet from that particular source IP address is to be disallowed. In another example, a SYN packet from a certain source IP address and that targets a certain destination port number may be designated to be disallowed. Any SYN packet that matches a policy in the black list policies is disallowed and is either silently dropped (i.e., not forwarded on to the intended target of the SYN packet and no response or further action taken) or a reset command may be returned to the initiator of the TCP session.

If the policy manager determines that the SYN packet passes the policy check and that the TCP session is permitted. The policy manager forwards the SYN packet, which was received from the NAT, to the destination node targeted by the SYN packet The destination node then returns a SYN-ACK packet (TCP header with both the SYN and ACK flags set to 1) to the computing system that originated the SYN packet, and the session originating computing system replies with an ACK packet (TCP header with ACK flag set to 1 and SYN flag cleared (0)). As such, the policy manager is involved in the TCP handshake only in terms of one of the three TCP handshake packets (i.e., the SYN packet in this example). The rest of the TCP handshake continues in its customary way. The forwarding of the SYN packet from the NAT to the policy manager for a security policy check adds relatively little to the overall latency of the TCP handshake procedure.

Although many of the embodiments described herein apply to policy checks made based on one of the packets of a three-way TCP handshake protocol, the principles apply to other types of session establishment protocols. Examples of such other session establishment protocols may include Secure Sockets Layer (SSL) and Transport Layer Security (TLS), and other protocols.

A policy check also can be made on TCP handshakes that are initiated from within the service provider's network that target a computing system external to the provider network. In this case, the SYN packet may be transmitted from the internal computing node (internal with respect to the service provider's network) to the external computing system (external with respect to the service provider's network). The return SYN-ACK packet from the eternal computing system is received by the NAT. The NAT determines that the packet is a SYN-ACK packet because the both the SYN and ACK flags are set and, because an attempted TCP handshake is underway, the NAT forwards the SYN-ACK packet to the policy manager which checks its black list policies to determine whether to allow or reject the SYN-ACK packet. If the SYN-ACK packet is rejected, the policy manager, as noted above, may silently drop the SYN-ACK packet or may send a reset packet to either or both of the internal nodes that sent the SYN packet and the computing system that returned the SYN-ACK packet.

In some embodiments, within the service provider's network, one or more virtual local networks or other virtual networks, between multiple computing nodes may be provided by creating an "overlay network" over one or more intermediate physical networks that interconnect the computing nodes. That is, a virtual network is implemented over a physical network to which the customers of the service provider are given access. The implementation of the overlay network may include modifying the headers of packets to map virtual addresses consistent with the virtual local network to physical addresses associated with the underlying physical network so that the packets can be routed through the physical network between computing nodes. In embodiments employing such an overlay network, packets transmitted between the NAT, the policy manager and the internal computing node(s) involved in the establishment of a TCP session are modified to effectuate their transmission on the overlay network.

Some embodiments may provide for multiple policy managers. In such embodiments, the NAT may map session establishment packets it receives to certain of the policy managers. For example, if a particular policy is to disallow session establishments initiated from a certain source IP address, then one of the policy managers may be programmed with that particular policy. A session establishment packets (e.g., SYN packet) from that particular source IP address will be forwarded to the policy manager that contains the security policy associated with that particular IP address. In this way, different policy managers may be programmed with different sets of security policies to enforce. Efficiency and reliability is increased relative to forcing all policy decisions to be made by a single policy manager, or even multiple policy managers all having the same set of policies to enforce. In one embodiment, the NAT may map session establishment packets to particular policy managers by computing a hash value of at least a portion of the packet (e.g., the source IP address). A hash table may be included to map hash values to IP addresses by which individual policy managers are addressed. The hash tables can be updated when desired to change the mappings, and the policies programmed into the various policy managers may be updated as well when desired.

In some embodiments, the black list security policies noted above represent packet characteristics which, if matched to a session establishment packet, will cause the policy manager to disallow the establishment of the communication session. In other embodiments, the security policies applied by the policy manager represent a white list which permits sessions to be established only if the session establishment packet matches the characteristics specified in such policies—i.e., sessions will not be permitted to be established if a packet does not match to one of the white list security policies.

By employing a policy manager that analyzes a session establishment handshake packet through the application of security policies, some sessions may not be permitted to be established. Preventing the establishment of sessions that otherwise would violate a security policy will enhance the security of the service provider's network and the computing resources and data managed by the customers of the service provider.

FIG. 1 is a network diagram illustrating an example embodiment of a service provider network. In this example, a provider network 100 is shown coupled to a global internet 135 external to the network 100. The global network 135 provides access to one or more computing systems 145a via a private network 140, to one or more other globally accessible data centers 160 that each may have multiple computing systems, and to one or more other computing systems 145b. The global internet 135 may be for, example, a publicly accessible network, possibly operated by various distinct parties, such as the Internet, and the private network 140 may, for example, be a corporate network that is wholly or partially inaccessible from computing systems external to the private network 140.

The provider network 100 includes a number of physical computing systems 105a-105d and 155a-155n, a communication manager module 150 that executes on one or more other computing systems (not shown in FIG. 1) to manage communications for the associated computing systems 155a-155n, and a system manager module 110 that executes on one or more computing systems (not shown in FIG. 1). In this example, each physical computing system 105a-105d hosts one or more virtual machine computing nodes and includes a virtual machine ("VM") communication manager. Each VM communication manager may be part of a virtual machine hypervisor monitor for the physical computing system. Computing system 105a is shown as executing one or more virtual machines 107a and a VM communication manager 109a. Computing systems 105b-d also are shown as executing one or more virtual machines 107b-d and VM communication managers 109b-d, respectively. Physical computing systems 155a-155n in this example do not execute any virtual machines and thus may each act as a computing node that directly executes one or more software programs on behalf of a customer of the service provider. In general, any mix of physical computers that host virtual machines and physical computers that do not host virtual machines is possible.

This illustrative provider network further includes multiple networking devices, such as switches 115a-115b, edge routers 125a-125c, and core routers 130a-13c. Switch 115a is part of a physical network that includes physical computing systems 105a-105c, and is connected to edge router 125a. Switch 115b is part of a distinct physical network that includes physical computing systems 105d, 155a-155n, and the computing systems providing the communication manager module 150 and the system manager module 110, and is connected to edge router 125b. The physical networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more networks. For example, edge router 125a provides a gateway between the physical network established by switch 115a and the interconnection network 120. Edge router 125c provides a gateway between the interconnection network 120 and the global internet 135. The core routers 130a-130c manage communications within the interconnection network 120, such as by forwarding packets or other data transmissions as appropriate based on characteristics of such data transmissions (e.g., header information including source and/or or destination addresses, protocol identifiers, etc.) and/or characteristics of the interconnection network 120 itself (e.g., routes based on network topology).

In some embodiments, communications to and/or from virtual machines 107a-107d and physical computing systems 155a-155n are provided on a virtual (overlay) network as noted above. The overlay network may be implemented in various ways in various embodiments, such as by using IPv4 ("Internet Protocol version 4") or IPv6 ("Internet Protocol version 6") packets as the overlay network packet size. For example, virtual network address information for a virtual network could be embedded in a larger physical packet network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions, or otherwise modifying such data transmissions to translate them from a first networking protocol for which they are configured to a distinct second networking protocol. In other embodiments IPv4 packets could be used. For example, the packet generated by the virtual machine could be fragmented and inserted into an IPv4 packet or be of a smaller size.

Use of the virtual overlay network may provide various benefits in various situations, such as limiting communications to and/or from computing nodes of a particular virtual network to other computing nodes that belong to the same virtual network. In this manner, computing nodes that belong to multiple virtual networks may share parts of one or more intermediate physical networks, while still maintaining network isolation for computing nodes of a particular virtual network. In addition, use of virtual overlay networks allows computing nodes of a virtual network to be physically moved, with the overlay network managing routing of communications for a particular virtual network address to a corresponding actual physical network address (e.g., by updating mappings that associate particular virtual network addresses of particular virtual networks to particular physical locations of computing nodes to which those virtual network addresses are assigned).

In some cases, such virtual overlay networks may be established and/or maintained via the operation by one or more communication managers at the edge of one or more intermediate physical networks, such as by configuring and otherwise managing communications for the virtual networks. In particular, groups of one or more computing nodes may each have an associated communication manager module that manages communications to and from those computing nodes. For example, in physical computing system 105a which hosts multiple virtual machine computing nodes 107a, a hypervisor or other virtual machine monitor manager on the physical computing system 105a may provide a virtual machine communication manager 109a for those particular virtual machine computing nodes. Similarly, physical computing systems 105b-d each may have a virtual machine communication manager module 109b-d, respectively. Further, one or more physical computing systems 155a-n may have an associated communication manager module 150 in at least some embodiments, such as provided by a proxy computing device through which communications to and from the physical computing systems 155a-n travel, as provided by a networking device (e.g., a switch, router, hub, etc.) through which communications to and from the physical computing systems travel, etc.

In at least some embodiments, one or more system managers 110 may facilitate configuring communications between computing nodes (e.g., virtual machines 107a-d, physical computing systems 155a-n), such as by tracking and/or managing which computing nodes belong to which virtual networks (e.g., based on executing programs on behalf of a customer or other entity), and by providing information about actual physical network addresses that correspond to virtual network addresses used for a particular virtual network (e.g., by a particular customer or other entity). For example, a system manager 110 may receive an indication of a virtual machine on a target physical computing system that is part of one of multiple physical networks. The system manager module 110 then may determine a virtual network with which the virtual machine is to be associated. After determining the virtual network associated with the virtual machine, the system manager module 110 then may initiate a configuration of a virtual machine communication manager module 109a-d for the target physical computing system so as to associate the virtual machine with the virtual network.

If embodiments in which an overlay virtual network is implemented and if a communication packet is to be sent between computing nodes in the service provider's network, the originating packet may include an IPv4 address, and a communication manager associated with the sending computing node embeds the virtual network packet into a substrate network packet. The communication manager then transmits the packet through the interconnection network 120. A communication manager associated with the receiving computing node receives the substrate packet, extracts the virtual network packet and forwards it on to the targeted computing node.

FIG. 1 also illustrates the use of a network device 166, which in the example of FIG. 1 is a NAT. Reference is made below to the NAT 166 determining whether to forward a communication session establishment packet to a policy manger for a security policy determination, but the techniques apply to other types of network devices besides a NAT. Packets from an outside computing system such as computing system 145a, 145b may have, as the destination IP address, a public IP address associated with a computing node within the provider network. Such packets target specific virtual machines 105a-105c, 105d and computing systems 155a-155n, but such virtual machines and computing systems are addressed internally to the provider network 100 through the use of a private IP address. A private IP address is not published to external entities. Thus, the NAT includes a mapping between public and private IP addresses so that incoming packets that have public IP addresses as the destination address can have their headers modified by the NAT to replace the public IP address with the corresponding private IP address. The NAT 166 then forwards the modified packets on through the interconnection network 120 to the node associated with the private IP address. A communication manager 162 also may be associated with the NAT 166 to permit the NAT 166 to forward modified packets through the overlay network as described above. As such, communication manager 162 functions in much the same way as the other communication managers (e.g., VM communication managers 109a, 109d and communication manager 150).

FIG. 1 also shows that the NAT 166 is communicatively coupled to a policy manager 170 The NAT 166 may send packets to the policy manager 170 through the communication manager 162, which implements the virtual overlay network. Alternatively, the communication manager 162 and policy manager 170 each may be associated with different communication managers. The communication manager 162 and policy manager 170 may communicate through the interconnection network 120 as well. The policy manager 170 may execute on a computing system (not shown in FIG. 1). The policy manager 170 stores, or otherwise has access to, security policies. The policy manager has its own private IP address, which is known by, or otherwise accessible to, the NAT 166. Attempts to establish a communication session between an external computing system (e.g., computing system 145a) and an internal virtual machine or computing system (e.g., virtual machines 107a-d, computing system 155a-n) may include at least one packet of a multi-packet handshake protocol to pass through the NAT 166. The following discussion focuses on establishing a TCP session, but as noted above, other embodiments may apply security checks associated with establishing other types of sessions (e.g., SSL, TLS, etc.).

A TCP session is established through a three-way handshake, which includes a SYN packet, a SYN-ACK response to the SYN packet, and an ACK packet response to the SYN-ACK packet. More specifically, before an initiating node attempts to connect with a target node, the target node must first bind to and listen at a port to open it up for connections: this is called a passive open. Once the passive open is established, the initiating node may initiate an active open. To establish a connection, the three-way (or 3-step) handshake occurs. In the first step, the active open is performed by the initiating node sending a SYN packet to the target node. The initiating node sets the sequence number in the SYN packet to a random value (e.g., A). In response, the target node replies with a SYN-ACK packet. The acknowledgment number is set to one more than the received sequence number (i.e., A+1), and the sequence number that the target node chooses for the packet is another random number (e.g., B). Finally, the initiating node sends an ACK packet back to the target node. The sequence number in the ACK packet is set to the received acknowledgement value (i.e., A+1), and the acknowledgement number in the ACK packet is set to one more than the received sequence number (i.e., B+1). At this point, both the initiating and target nodes have received an acknowledgment of the connection. The first two steps (SYN and SYN-ACK packets) establish and acknowledge the connection parameter (sequence number) for one direction. The second and third steps (SYN-ACK and ACK packets) establish the connection parameter (sequence number) for the other direction and it too is acknowledged. At this point, a full-duplex communication session is established.

In one example, an external computing system (e.g., 145a) attempts to establish a TCP connection with an internal node (e.g., virtual machine 105a). The computing system 145a generates a SYN packet targeting virtual machine 105a and using the public address of the targeted virtual machine 105a. The SYN packet is routed through the private network 140, global Internet 135, and to the NAT 166. The NAT receives the packet and checks the state of the SYN flag. The NAT receives packets that are part of the TCP session establishment protocol, as well as packets that are part of normal data traffic (e.g., packets during a session). The NAT checks the SYN flag of each received packet to determine whether each such packet is a SYN or SYN-ACK packet (i.e., part of a communication establishment handshake. Upon determining that the SYN flag is not set (which is indicative of the packet not being either a SYN or SYN-ACK packet), the NAT 166 maps the packet's public source IP address to a private IP address and replaces the packet's public source IP address with the corresponding private IP address, and forwards the packet to the destination node (e.g., 105a in this example) corresponding to the private IP address. The packet header may be further modified by the communication manager 162 to allow the packet to be routed through the overlay virtual network implemented by the various communication managers as explained above. Upon determining, however, that the SYN flag is set, which is indicative of the packet being a SYN packet (or SYN-ACK packet), the NAT 166 forwards the SYN packet to the policy manager 170. Forwarding the SYN packet to the policy manager 170 may include the use the communication manger 162 as well for the packet to be transmitted on the overlay network. The NAT 166 forwards the SYN packet to the IP address associated with the policy manager 170, while also retaining the original destination IP address The original destination IP address will be used by the policy manager to subsequently forward the packet on to the destination node to complete the session establishment handshake after the packet passes a security check by the policy manager.

Figure 2:
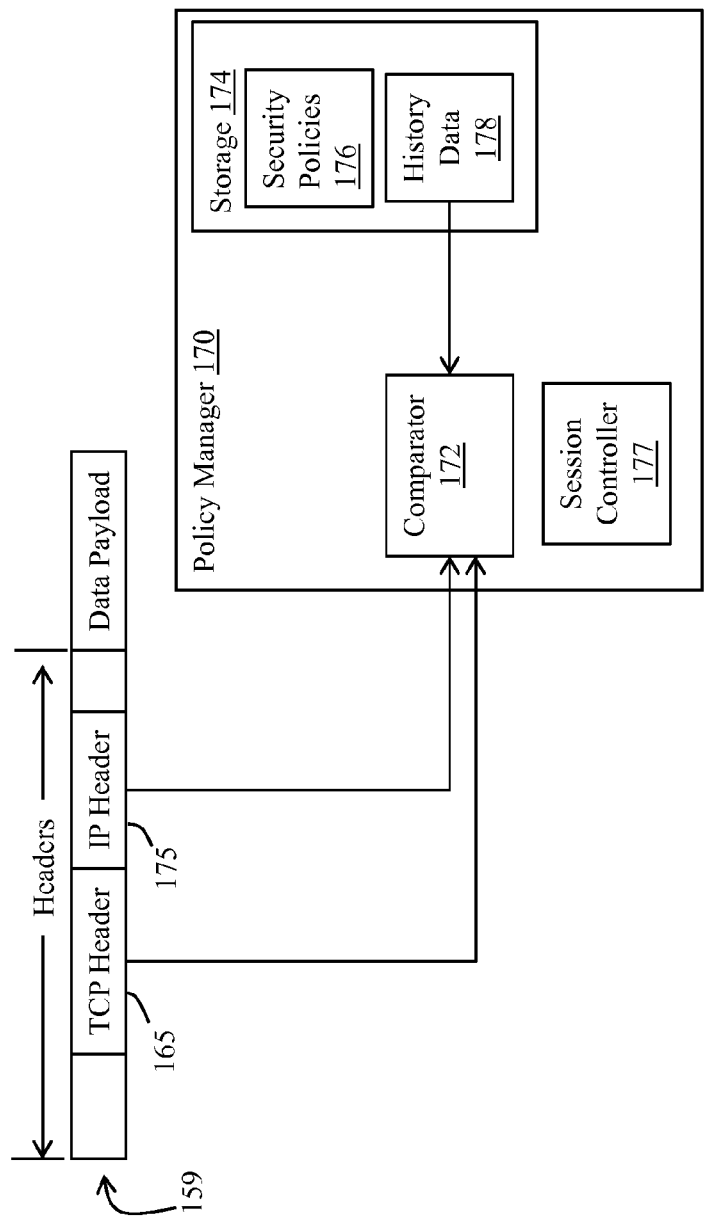
FIG. 2 illustrates a policy manager performing a security policy check based on information from a packet's headers in accordance with various examples.

The policy manager 170 receives the SYN packet and performs a security policy check using, in some embodiments, information contained in the headers of the packet. FIG. 2 illustrates an example of a policy manager 170 that receives and process a packet 159. The packet 159 may be a SYN (or SYN-ACK) packet. The policy manager receives information from a layer 3 IP header 165 (e.g., IPv4) and/or from a layer 4 TCP header 175 of a single SYN packet. The policy manager 170 may extract one or more of the various fields of the headers 165, 175 when performing a security check on the attempted establishment of the TCP connection. In some examples, the policy manager extracts one or more of the following fields from the IP header 165: identification, source IP address, and destination IP address, and extracts one or more of the following fields from the TCP header 175: source port and destination port. Additional or different fields from the headers may be extracted by the policy manager 170 for use in the security check.

In the example shown, the policy manager includes a comparator 172, storage 174, and a session controller 177. Storage 174 may comprise random access memory or another type of storage medium. The storage 174 can be used to store security policies 176 and history data 178. The security policies 176 include security policies that are indicative of those attempted TCP sessions that should not be allowed. An example of such a security policy is one, which includes one or more specific source IP address. This policy will cause the policy manager 170 to prevent the establishment of a TCP session in which the SYN packet originates from that specific source IP address. In another example, a security policy may include a specific source IP address and a specific destination port. This policy will cause the policy manager 170 to prevent the establishment of a TCP session in which the SYN packet originates from that specific source IP address and that targets the specific destination port. The comparator 172 compares the security policies 176 to each received SYN packet to determine if any of the security policies match the corresponding fields of the SYN packet. In some embodiments, the storage 174 may be implemented as a content addressable memory (CAM), which permits the comparator 172 to efficiently compare the received SYN packet to the various black list policies 176 stored in the storage 174.

The comparator 172 informs the session controller 177 of the results of the comparison (i.e., whether or not the SYN packet resulted in a violation of a security policy). If the comparator 172 determines that the SYN packet does not violate any of the security policies 176, the session controller 177 forwards the SYN packet through the interconnection network 120 to the destination node corresponding to the destination IP address and destination port in the headers 165, 175. The communication manager 162 may re-header the packet due to the overlay network, if an overlay network is in fact implemented in the data center 100. If, however, the comparator determines that the SYN packet matches any of the security policies 176, the session controller 177 will prevent the TCP session from establishing. In one embodiment, the session controller 177 simply does not forward the SYN packet to its intended destination, and eventually the attempted TCP session will time-out. The session controller 177 also may generate and send a reset packet to the originator of the SYN packet, which causes the originator to reset its attempted TCP session. In either case, the intended target of the SYN packet never receives the SYN packet and remains unaware that an attempt to establish a TCP session with that target was initiated.

The session controller 177 may store information about each packet evaluated by the policy manager 170 in history data 178. History data 178 may include source IP addresses, destination IP addresses, source port numbers, destination port numbers, etc. As explained below, the history information for each processed packet subsequently may be used to assess threat risks which can then be used to update the security policies.

The history data 178 also can be used to evaluate the various security policies 176. That is, information the headers (e.g., source IP address, destination port, etc.) as well as the history data 178 can be compared to the security policies 176 to determine whether to permit the communication session to be established. Further still, one or more metrics of the history data 178 can be computed and used in the evaluation of the security policies. An example of a metric is a packet rate—that is, the number packets per unit time. A metric could be computed for the rate of packets that target a particular destination IP address or that are from a particular source IP address. A security policy may be included that disallows a particular communication session from being established if a SYN packet originates from a particular source IP address if greater than a threshold rate of packets from that IP address has been received by the policy manager 170. Other types of metrics are possible as well.

Figure 3:
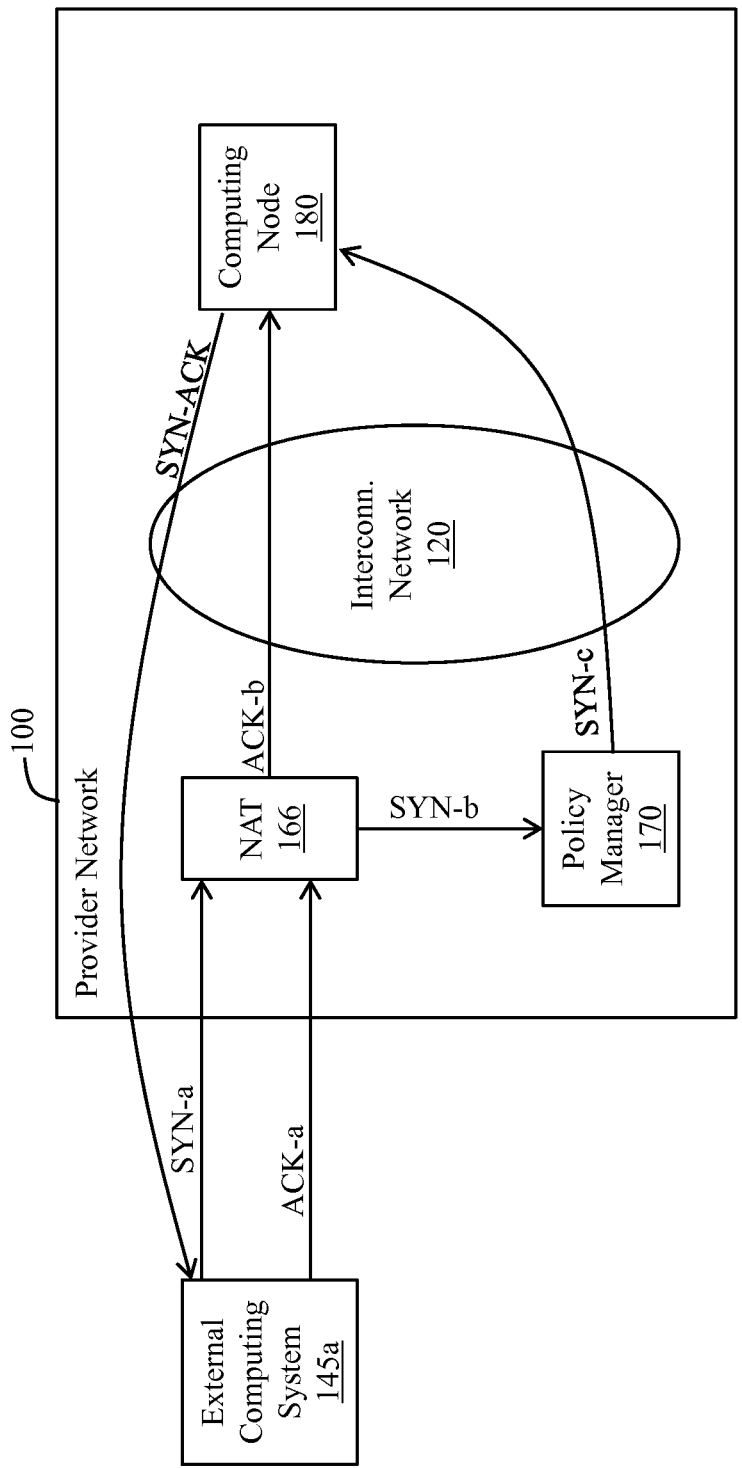
FIG. 3 shows a system diagram in which a policy manager performs a security policy check based on a communication session establishment packet originated by an external computing system in accordance with various examples.

FIG. 3 shows a packet system diagram illustrating the flow session establishment packets in accordance an embodiment. The flow of packets in FIG. 3 may be consistent with an overlay network if such an overlay network is implemented within the provider network 100, and implementation details as to the overlay network (e.g., the communication managers) are omitted from FIG. 3 for ease of understanding. An external computing system 145a generates and sends a SYN packet intended for target computing node 180 internal to the data center 100. External computing system 145a is used in this example, but any other external computing system may initiate the SYN packet as well. The computing node 180 that is targeted by the SYN packet may be a virtual machine (e.g., virtual machine 107a,d or a non-virtual machine computing system (e.g., computing system 155a-n).

The SYN packet sent by the external computing system 145a is designated as SYN-a. The NAT 166 receives the SYN-a packet, determines that it is a SYN packet (e.g., determines that the SYN flag is set but not the ACK flag) and, as a result, forwards the SYN packet (now designated as SYN-b) to the policy manger 170. Of course, if the SYN flag is not set, the NAT 166 will convert the public destination IP address in the header of the packet with the corresponding private IP address and forward the packet on to its intended destination. Upon receiving the forwarded SYN-b packet, the policy manager 170 performs a security policy check using information from the headers of the SYN-b packet (e.g., the layer 4 and layer 3 headers). If the security policy check fails (e.g., a match exists to a security policy), then the TCP session is precluded by the policy manager 170 from being established. If the security policy check passes (e.g., no match to a security policy), the SYN-b packet is forwarded (now designated as SYN-c) on to computing node 180. Similar to the NAT, the policy manager 170 may convert the public destination IP address corresponding to the intended recipient of the SYN packet (computing node 180) which is retained in the header of the packet with the corresponding private IP address before forwarding the SYN-c packet to computing node 180. The packet's header may further be modified if an overlay network is implemented as explained above.

The computing node 180 receives the SYN-c packet and, in response, generates and returns a SYN-ACK packet. In some embodiments, the SYN-ACK packet is not returned to the external computing system 145a through the policy manager 170 and NAT 166. Instead, the SYN-ACK packet flows through the interconnection network 120 and other network infrastructure (e.g., the global network 135 and private network 140 (FIG. 1) to the external computing system 145a. The external computing system 145a receives the SYN-ACK packet and generates and returns an ACK packet to the computing node 180 to complete the establishment of the TCP session. The ACK packet generated by the external computing system 145a is illustrated as ACK-a in FIG. 3. The NAT 166 receives the ACK-a packet, converts its public source IP address to a private IP address and forwards the modified ACK-a packet as ACK-b through the interconnection network 120 to the computing node 180.

Figure 4:
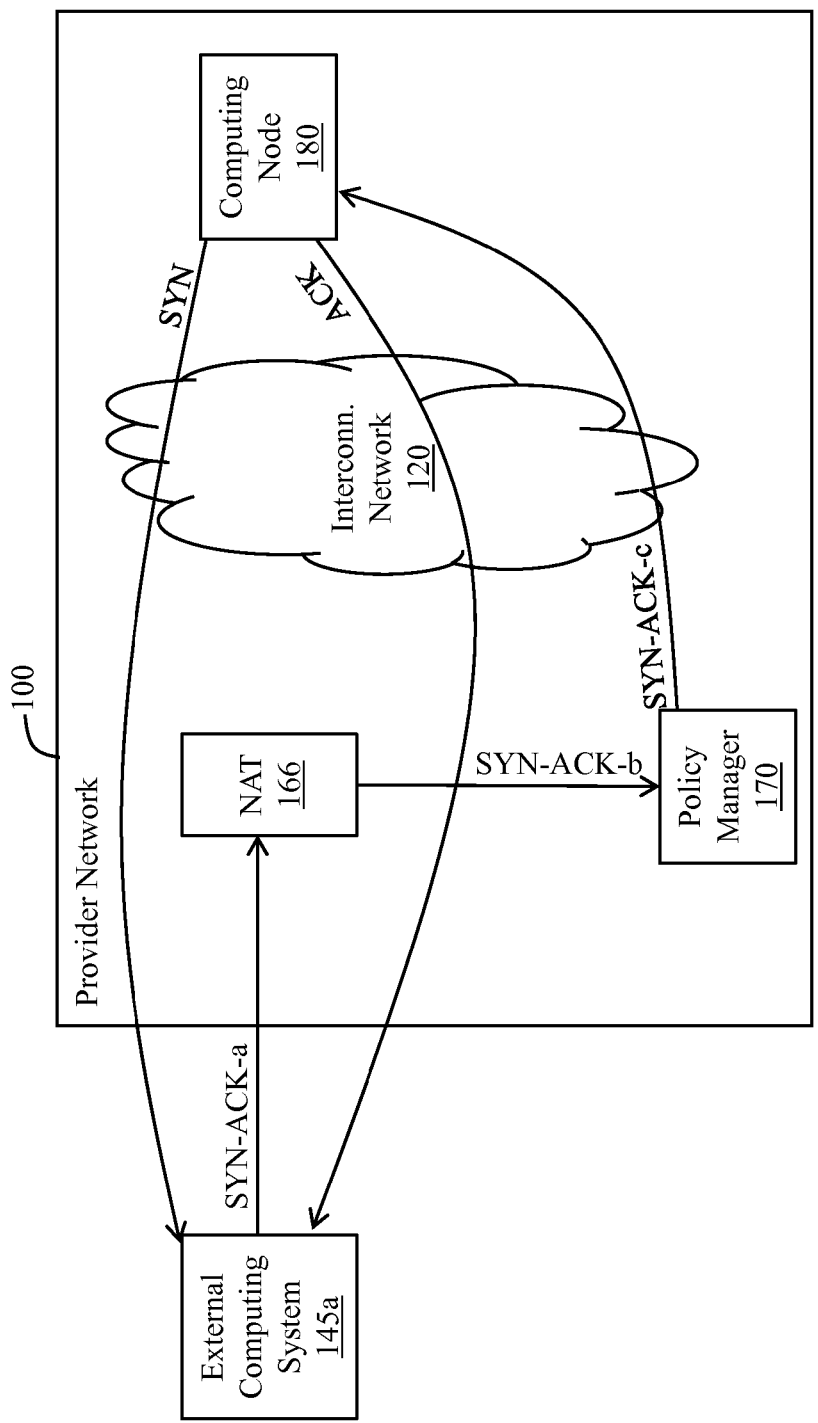
FIG. 4 shows a system diagram in which a policy manager performs a security policy check based on a communication session establishment packet originated by computing node internal to a service provider's data center in accordance with various examples.

FIG. 4 illustrates an example of the computing node 180 attempting to initiate a TCP session with the external computing system 145a. The computing system 180 generates a SYN packet and sends the SYN packet through the interconnection network 120 to the external computing system 145a as shown. The external computing system 145 generates and returns a SYN-ACK packet (shown as SYN-ACK-a) which is received by the NAT 166. The NAT 166 checks the SYN flag and, if set (which it will be for a SYN-ACK packet), forwards the SYN-ACK-a packet to the policy manager 170 as a SYN-ACK-b packet.

Upon receiving the forwarded SYN-ACK-b packet, the policy manager 170 performs a security policy check using information from the headers of the SYN-ACK-b packet. If the security policy check fails (e.g., a match exists to a security policy), then the TCP session is precluded from being established. If the security policy check passes (e.g., no match to a security policy), the SYN-ACK-b packet is forwarded (now designated as SYN-ACK-c) on to computing node 180. Similar to the NAT, the policy manager 170 may convert the public destination IP address in the header of the packet with the corresponding private IP address and before forwarding the SYN-ACK-c packet to computing node 180. The computing node 180 receives the SYN-ACK-c packet and generates and returns an ACK packet to the external computing system 145a to complete the establishment of the TCP session.

Figure 5:
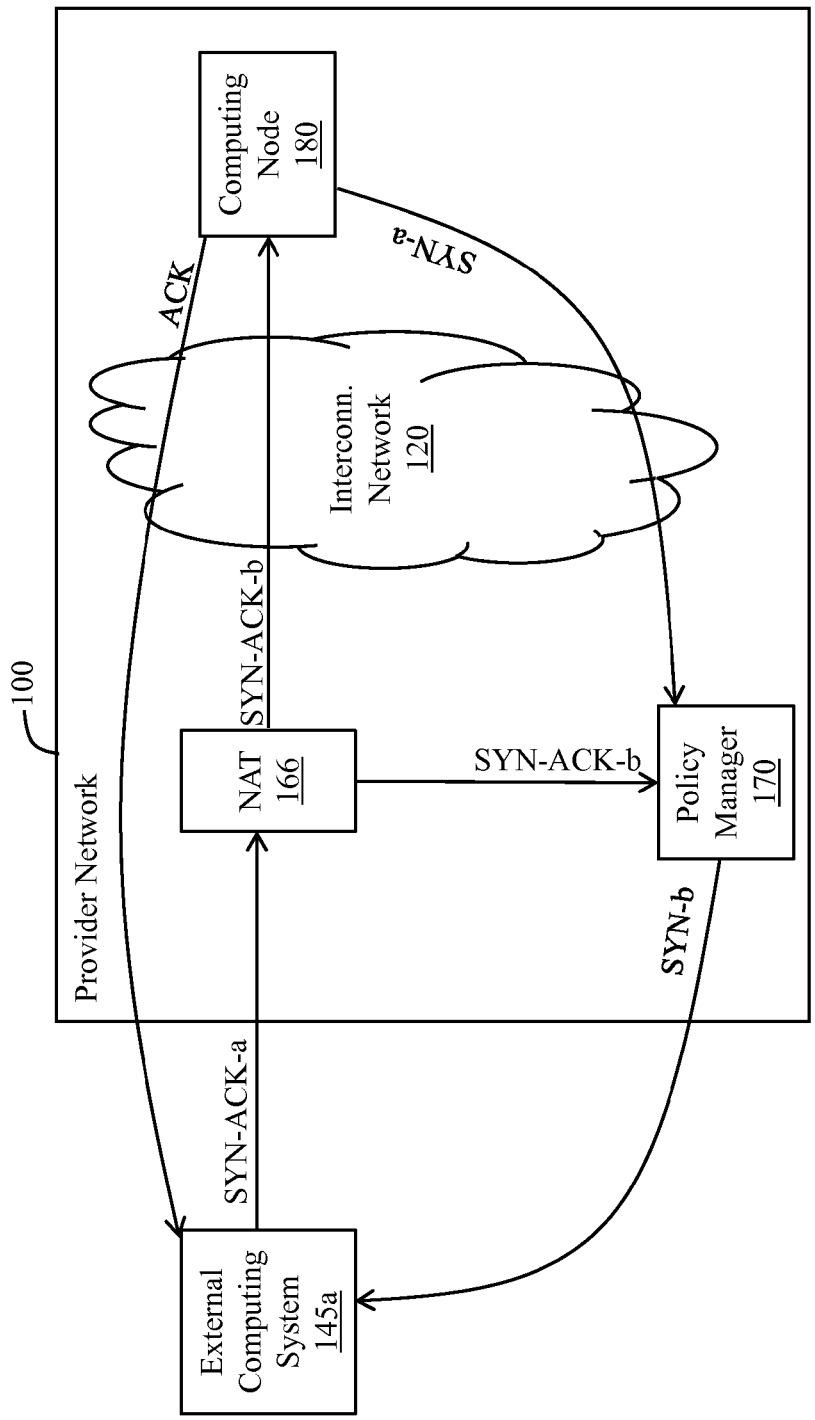
FIG. 5 shows another example of system diagram in which a policy manager performs a security policy check based on a communication session establishment packet originated by computing node internal to a service provider's data center in accordance with various embodiments.

FIG. 5 illustrates an embodiment in which the data center's internal computing node 180 generates a SYN packet and forwards it directly to the policy manager 170, rather than sending the SYN packet to the destination external computing system 145a. The computing node 180 or perhaps its communication manager in the event an overlay network is implemented can be configured to send SYN packets to the policy manager 170 for a security policy check. The SYN packet sent to the policy manager 170 is shown as SYN-a. The SYN-a packet header includes the IP address of the policy manager 170 but also includes the IP address of the targeted external computing system 145a. The policy manager 170 performs the policy check as explained above. If the security policies include certain IP addresses outside the provider network (e.g., the IP address of the external computing system 145a), the policy manager 170 will need to check the destination IP address instead of the source IP address in the SYN-a packet's header as the packet is destined for a potentially problematic computing system.

In some embodiments, if TCP sessions with respect to certain IP addresses are to be disallowed, the policy manager 170 may check either the source or the destination IP addresses in the packet. As such, if TCP sessions with respect to a certain IP address is to be disallowed and the external computing system 145a initiates a SYN packet, the policy manager 170 may check the source IP address for that particular IP address. However, if data center's internal computing node 180 initiates the SYN packet, the policy manager 170 may check the destination IP address for that particular IP address.

Referring still to FIG. 5, if the policy check fails, the policy manager 170 disallows the TCP session. If, however, the policy check passes, the policy manager 170 modifies the header of the SYN-a packet to generate a SYN-b packet (that is properly formatted for being transmitted to external computing system 145a) and forwards the SYN-b packet on to the target external computing system 145a. The external computing system 145a generates and returns a SYN-ACK-a packet, which is forwarded on to the computing node 180 by the NAT, after converting the public destination address of the computing node 180 to its private address. The computing node 180 then returns an ACK packet to the external computing system 145a to complete the establishment of the TCP session.

Figure 6:
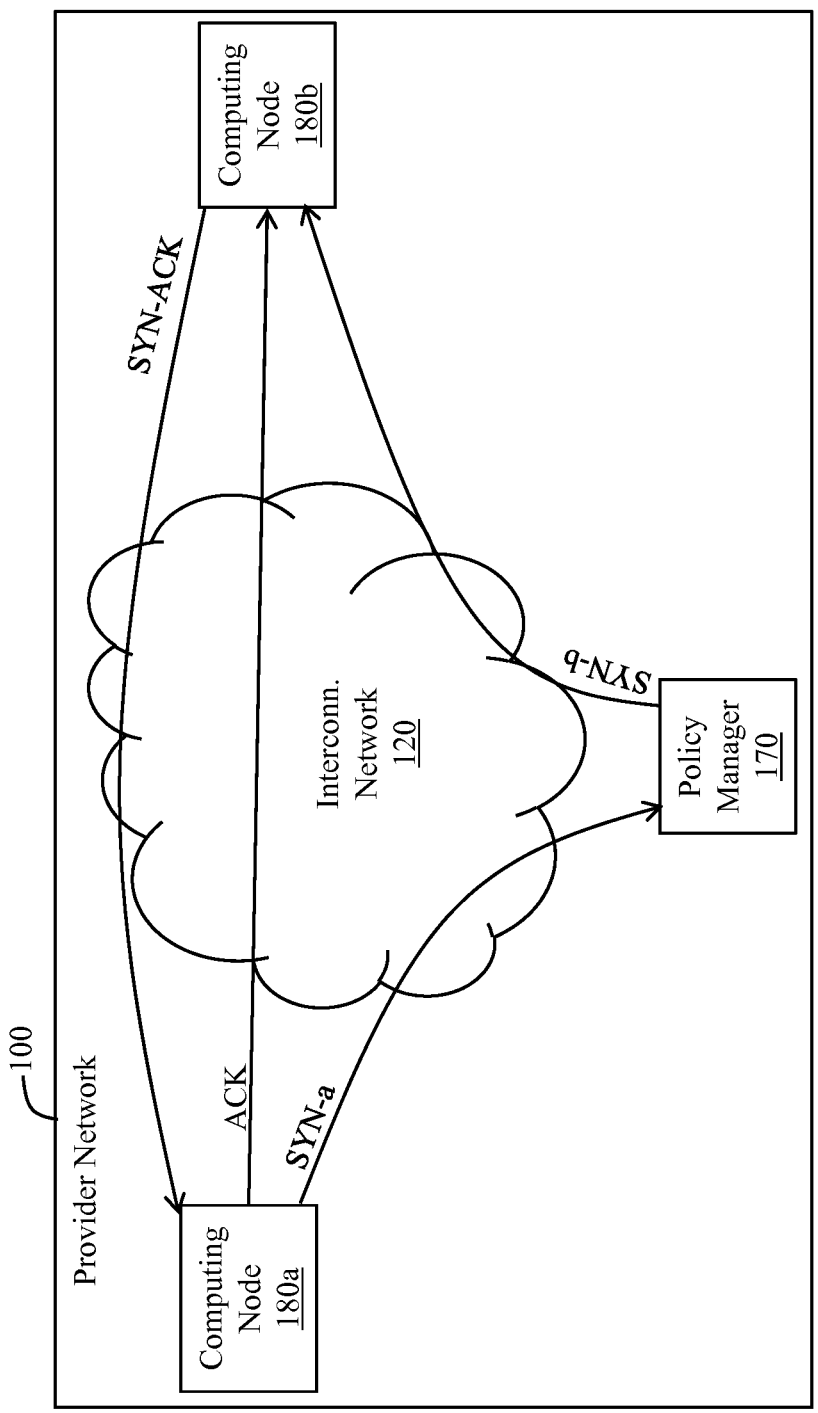
FIG. 6 is a system diagram in which a policy manager performs a security policy check based on an attempt to establish a communication session between two computing nodes internal to a service provider's network.

FIG. 6 shows an example of policy checking during an attempt to establish a TCP session between computing nodes internal to the provider network 100. In this example, computing node 180a is attempting to establish a TCP session with computing node 180b. As such, computing node 180a generates a SYN packet (SYN-a), which it provides to the policy manager 170 for a policy check, rather than directly to computing node 180b. The SYN-a packet, however, has the address of computing node 180b so that the policy manager 170 can forward the SYN packet on to computing node 180b if no security policy violation is detected. The policy manager 170 compares the SYN-a packet to its security policies 176. If the policy manager 170 discovers a match between information in the headers of the SYN-a packet and the security policies 176, the policy manager takes an appropriate security action such as silently dropping the packet or sending a reset packet back to computing node 180a.

If the policy manager 170 does not discover a match between the SYN-a packet and the security policies 176, the policy manager 170 forwards the SYN-a packet on to the target computing node 180b (shown as SYN-b in FIG. 6). The computing node 180b returns a SYN-ACK packet back to computing node 180a which, in turn, sends back an ACK packet to computing node 180b. As before, the policy manager 170 is only involved in receiving and forwarding on one of the three handshake packets of the TCP session establishment protocol.

Figure 7:
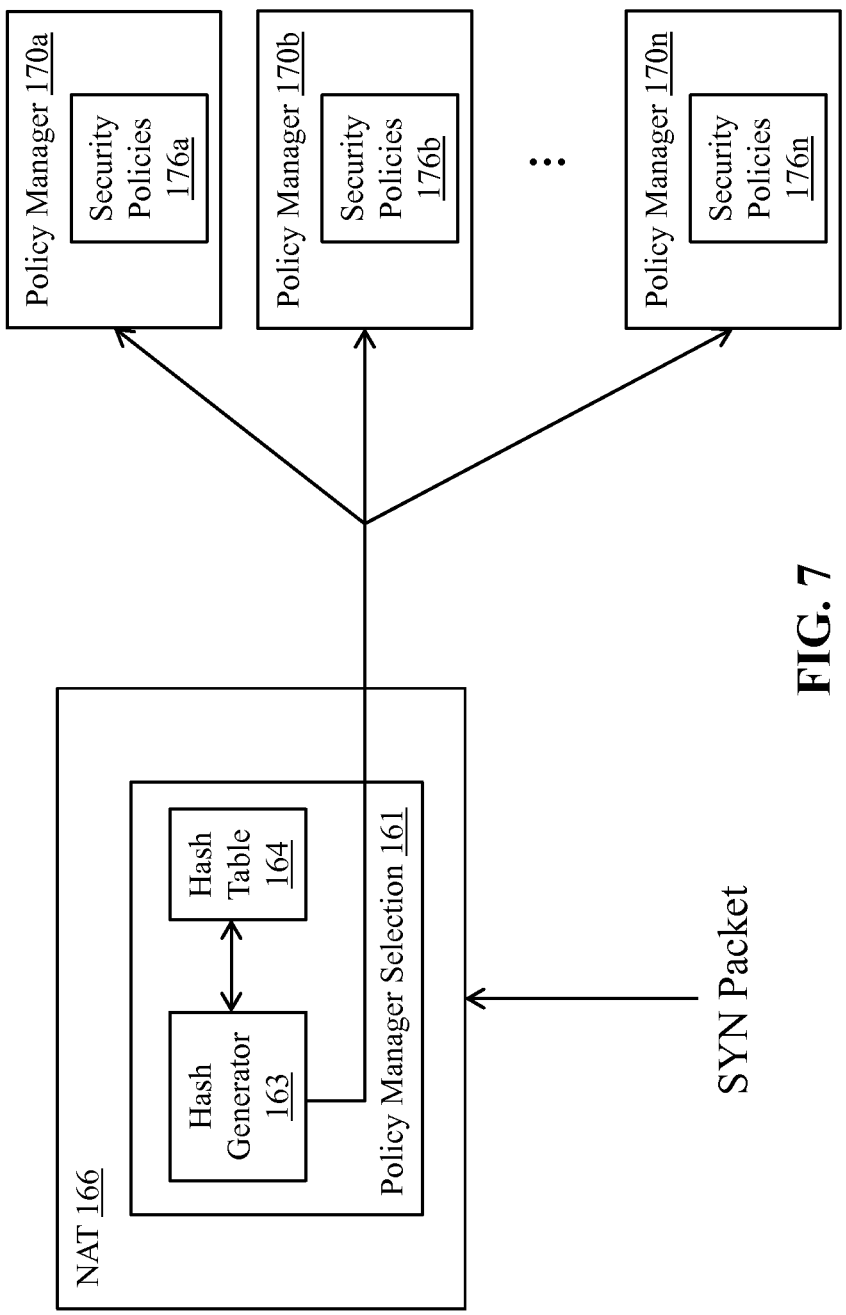
FIG. 7 is a system diagram illustrating a network address translator and multiple policy managers in accordance with various embodiments.

The policy manager 170 shown in FIGS. 1-6 may be implemented as a single policy manager or multiple policy managers. FIG. 7 illustrates an embodiment in which multiple policy managers 170a-n are shown. Each policy manager 170a-n may be configured to have the same or a different set of security policies 176. For example, policy manger 176a includes security policies 176a, while policy managers 176b and 176n include security policies 176b and 176*n*, respectively. Each respective policy manager 170*a-n* may be run on separate computing systems or may multiple applications that run on a common computing system. By providing multiple policy managers 170*a-n*, the policy check of potentially a high volume of TCP session establishments may occur more efficiently than if only a single policy manager 170 was used. Further, by including different security policies 176*a-n* on each policy manager 170*a-n*, each policy manager can be configured to check certain desired security policies. For example, if a certain IP address on the internet is determined to be untrustworthy, a policy targeting that particular IP address can be added to the security policies 176 of one of the policy managers 170*a-n*. Subsequently, when a TCP establishment packet is received by the NAT 166 (e.g., a SYN or SYN-ACK packet), the NAT 166 determines which of the policy managers 170*a-n* potentially contains a security policy corresponding to that particular IP address. The session establishment packet is then forwarded by the NAT to that particular policy manager for the security policy evaluation.

In the example of FIG. 7, the NAT 166 includes a policy manager selection logic 161, security which determines to which policy manager 170*a-n* to forward a particular session establishment packet for a security policy evaluation. The policy manager selection logic 161 includes a hash generator 163 and a hash table 164 in such embodiments. The hash generator 163 computes a hash of, for example, the source IP address of the TCP session establishment packet (either SYN or SYN-ACK packets). The computed hash value can then be used as an index into a hash table 164. The hash table maps hash values to identities of the various policy managers 170*a-n*. In some examples, the identities of the policy managers include their IP addresses. As such, all session establishment packets from a particular source IP address will consistently map to a particular policy manager 170*a-n*, and thus that policy manager will perform a policy check on all of the session establishment packets from that particular source IP address.

Figure 8:
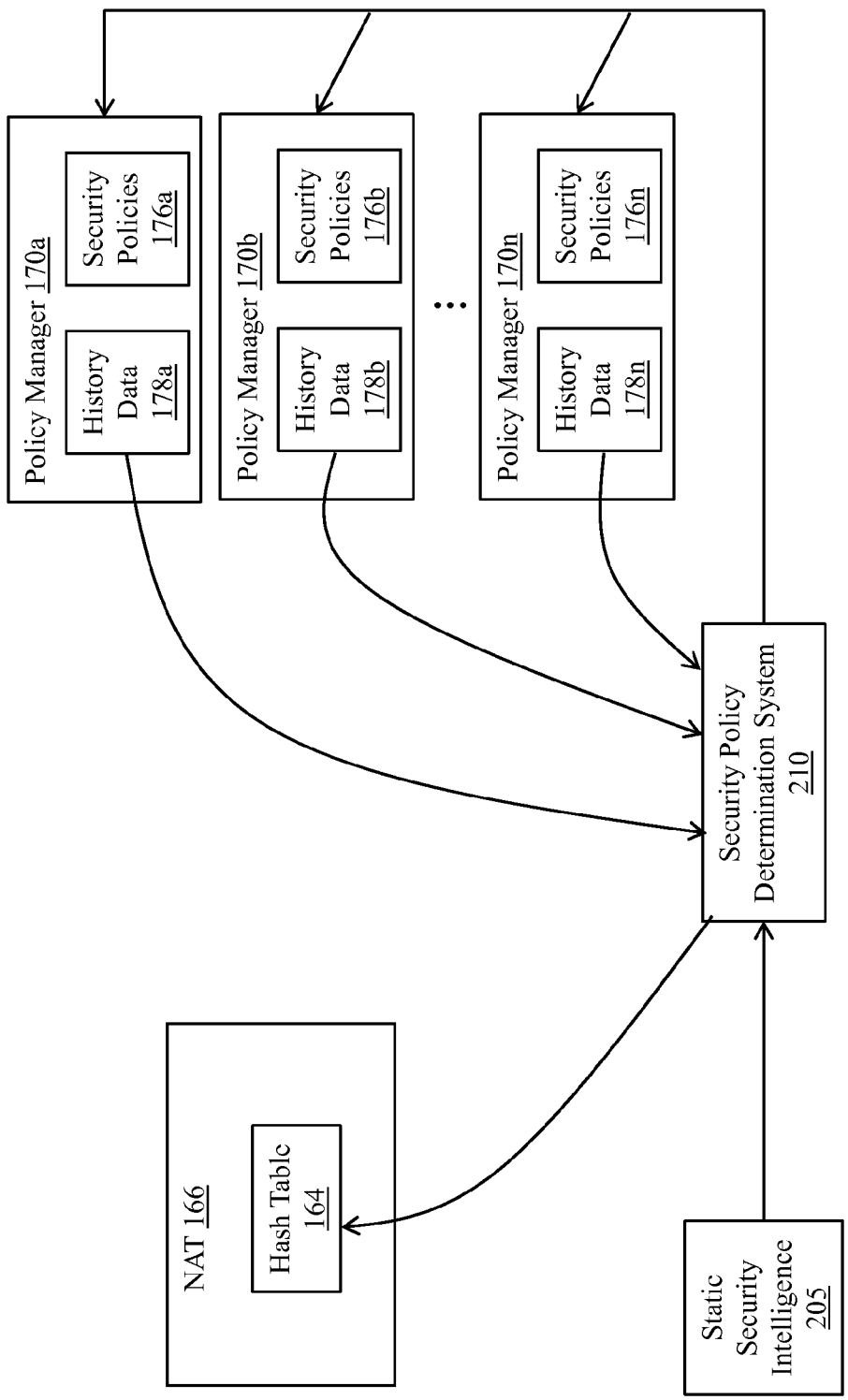
FIG. 8 is a system diagram illustrating a policy determination system and its ability to update the security policies in multiple policy managers.

FIG. 8 illustrates how the security policies are created and managed. A security policy determination system 210 is shown coupled to the NAT 166 and the various policy managers 170*a-n*. The security policy determination system 210 may include instructions that are executed on a computing system. The policy determination system generates and updates the security policies 176*a-n* based on various inputs. One illustrative input includes static security intelligence 205, which may be a data structure that the service provider has purchased or otherwise generated or obtained. The static security intelligence, for example, may have been generated by a third party security analysis organization. The analysis may include monitoring the behavior of traffic on the internet and discovering potential security concerns. For example, the traffic monitoring might discover a large volume of packets from a particular IP address from another country that is targeting a certain geographic region of the United States, or the traffic monitoring may notice a large volume of packets from a certain source IP address that targets ports that are otherwise closed. At any rate, the traffic monitoring organization (which may include computers) generates one or more static security intelligence data structures 205 that can be provided to the service provider's security policy determination system 210 and updated as desired.

Further still, the policy managers 170*a-n* may maintain a history log 178 as noted above. Policy manager 170*a* includes a history log 178*a*. Policy manager 170*b* includes a history log 178*b*. Policy manager 170*n* includes a history log 178*n*. Each of the policy managers 170 collect and store log data about each session establishment packet that it receives and on which it performs a security policy check. The collected log data may include information from the packet headers such as source IP address, destination IP address, source port, destination port, etc. The log data may be collected both for packets that resulted in determinations of a policy violation as well as packets that did not result in a policy violation. The policy determination system security receives a copy of the history logs 178*a-n* upon request, on a scheduled basis, or otherwise. The security policy determination system 210 analyzes the history log data in an effort to detect potentially new security threats. For example, a particular IP address may not have been deemed to be associated with any sort of security threat, but a more recent download of a history log 178 indicates a large increase in traffic from that IP address that targets data center computing nodes associated with different service provider customer accounts (e.g., more than a threshold volume of traffic in a particular period of time targeting more than a threshold number of different customer accounts). Such detected behavior may cause the security policy determination system 210 to generate a new black list policy listing this particular IP address. New security policies or updates to the existing security policies are provided by the security policy determination system 210 (as indicated by arrow 211) to the security policies 176*a-n* of the various policy managers 170*a-n*. In some embodiments, an update to the security policies 176 of one policy manager 170 may cause that policy manager 170 to push the updates to the security policies of the other policy managers 170. In addition to generating and/or updating the security policies 176, the security policy determination system 210 may also generate and/or update the hash table 164 of the NAT 166. As explained above, the hash table 164 maps hash values to identities of the various policy managers 170. The security policy determination system 210 thus may alter the hash table mappings to cause, for example, a session establishment packet from a particular IP address to be mapped to a different policy manager 170 as desired.

Figure 9:
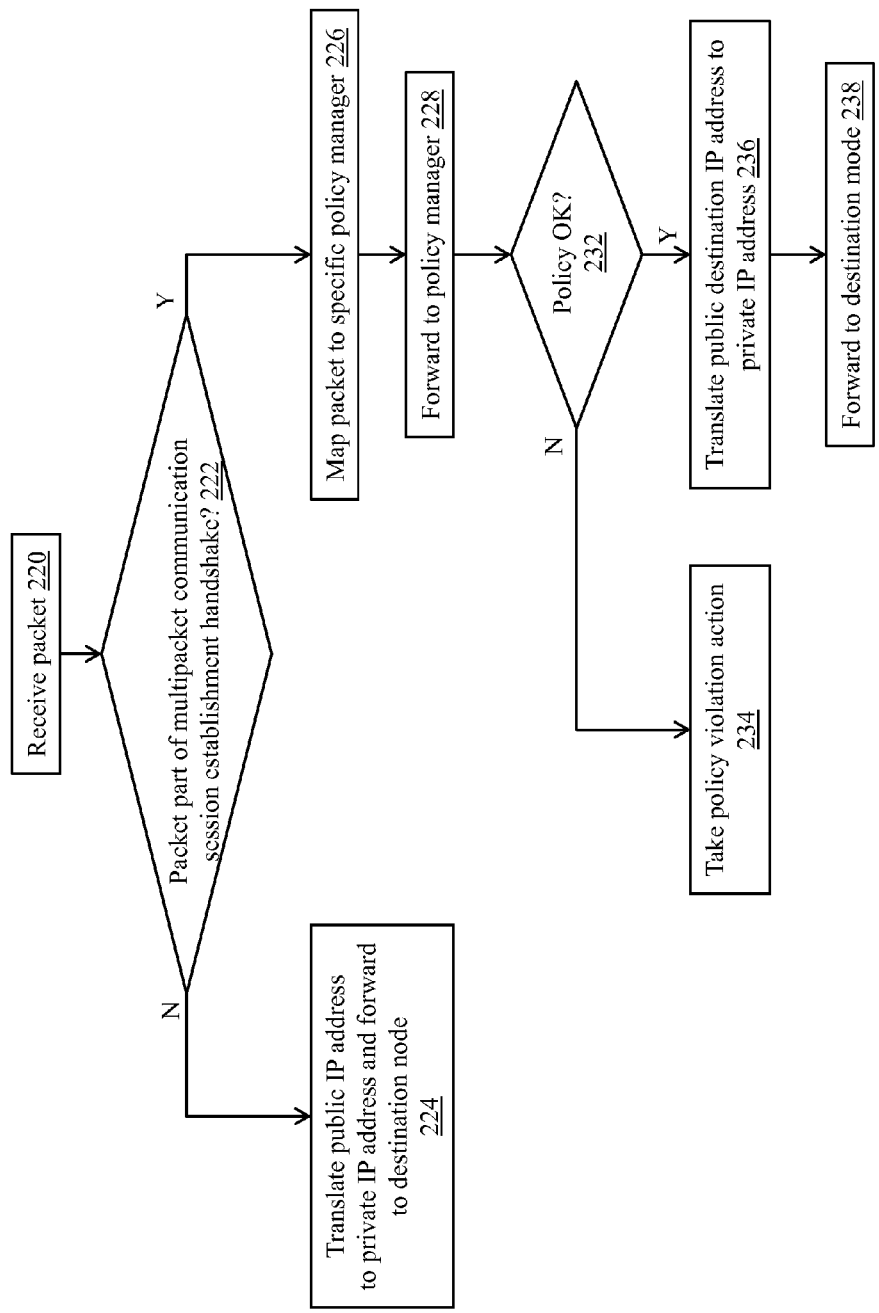
FIG. 9 is a method flow chart in accordance with various embodiments.

FIG. 9 illustrates a method flow chart in accordance with various embodiments. The operations can be performed in the order shown, or in a different order. Further, two or more of the operations may be performed in parallel rather than sequentially. At 220, a session establishment packet is received, for example, by the NAT 166. The packet may be received from an external computing system (i.e., external to the data center such as from computing system 145*a*) or from an internal computing node such as a virtual machine or other type of computing system owned and operated by the service provider. The session establishment packet may be a SYN or SYN-ACK packet associated with the three-way TCP session establishment protocol, or a session establishment packet of a different protocol (e.g., SSL, TLS, etc.). For both a SYN and a SYN-ACK packet the SYN flag is set in the packet's TCP header. The NAT 166 determines at 222 whether the packet is part of a multipacket communication session establishment handshake (e.g., whether the SYN flag is set in the case of TCP handshakes). If the packet is not a session establishment handshake packet (e.g., if SYN flag is not set which indicates the packet is not a SYN or SYN-ACK packet), then at 224, the method may include translating the public destination IP address to a corresponding IP address and forwarding the modified packet to the target destination node.

If, however, the packet is a session establishment handshake packet (e.g., TCP SYN flag is set), then the packet is either a SYN packet or a SYN-ACK packet. Either way, at 226 the method includes mapping the packet to a particular policy manager 170. In some embodiments and as explained above, the NAT 166 may compute a hash value of a portion or all of the packet's header (e.g., the source IP address) and accesses a hash table to determine which policy manager is mapped to that particular hash value. At 228, the NAT forwards the SYN or SYN-ACK packet to the policy manager 170. The IP address of the specified policy manager 170 may be obtained from the hash table mentioned above. The NAT may modify the header of the packet to include the IP address of the specified policy manager 170 in order to forward it to the specified policy manager 170.

At 230, the method includes performing a security policy assessment on some or all of the headers of the packet. The policy assessment is performed by the policy manager 170 that received the packet from the NAT. In some embodiments, the security policy assessment can be performed by comparing various fields within the packet's headers to the security policies 176 contained within or otherwise accessible to the policy manager 170. If no "hit" on any of the security policies is determined at 232, then at 236, the public destination IP address is translated to a private IP address. The private IP address is then included in the packet's header (e.g., in place of the public IP address). At 238, the packet may be transmitted across the physical infrastructure of the interconnection network 120 from the overlay network. Operation 2238 may include modifying the header of the packet to include the IP address of the specified policy manager 170.

However, if a hit on a security policy is detected at 232, then at 234, the method includes taking a policy violation action. In some embodiments, this action includes not forwarding the session establishment handshake packet on to its intended destination to thereby cause the session not to be established. The action of 234 also may include sending a reset packet to at least the originator of the packet.

Figure 10:
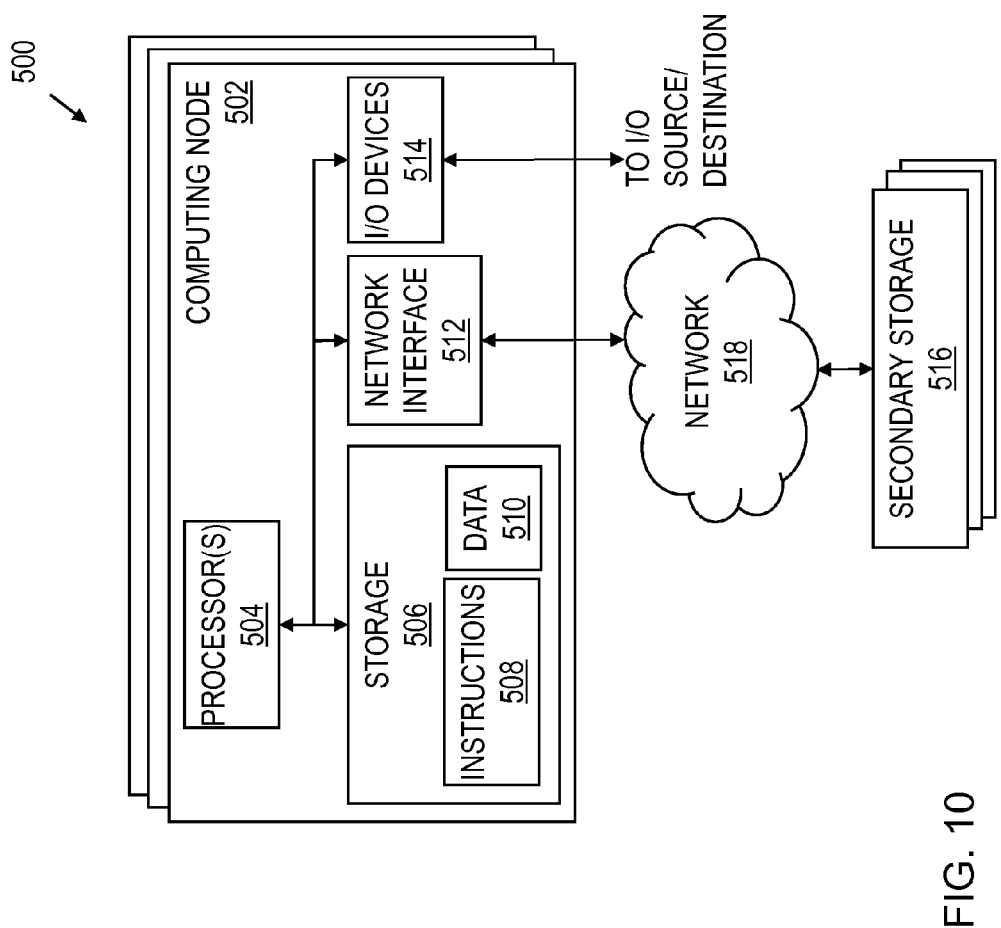
FIG. 10 is a block diagram illustrating an example of a computing device that may be used in some embodiments.

FIG. 10 shows a schematic diagram for a computing system 500 suitable for implementation of at least some of the provider network 100, including the functionality of the network device (e.g., NAT 166) to detect the presence of a packet establishment handshake packet and to forward such a packet to a policy manager 170, as well as the functionality of the policy manager itself and the security policy determination system 210 as described herein in accordance with various embodiments. The system includes one or more computing nodes 502. The computing system 500 includes the computing nodes 502 and secondary storage 516 communicatively coupled together via a network 518. One or more of the computing nodes 502 and associated secondary storage 516 may be used to provide the functionality of the NAT 166, the policy manager, and the security policy determination system 210.

Each computing node 502 includes one or more processors 504 coupled to memory 506, network interface 512, and I/O devices 514. In some embodiments, a computing node 502 may implement the functionality of more than one component of the system 100. In various embodiments, a computing node 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the web services platform 102, each of the computing nodes 502 may implement the same ISA, or individual computing nodes and/or replica groups of nodes may implement different ISAs.

The storage 506 may include a non-transitory, compute eatable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 10 implementing the functionality disclosed herein are stored within storage 506. For example, instructions 508 may include instructions that when executed by processor(s) 504 implement the NAT 166, the policy manager 170, and the security policy determination system 210 and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing nodes 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing node 502 for execution by a processor 504 by transmission media or signals via the network 518, which may be a wired or wireless network or a combination thereof. Each of the resource manager 180 and interface manager 183 may be implemented as a separate computing node 502 executing software to provide the computing node with the functionality described herein. In some embodiments, the resource manager 180 and interface manager 183 may be implemented by the same computing node.

The network interface 512 may be configured to allow data to be exchanged between computing nodes 502 and/or other devices coupled to the network 518 (such as other computer systems, communication devises, input/output devices, or external storage devices). The network interface 512 may support communication via wired or wireless data networks, such as any suitable type of Ethernet network, for example; via telecommunications/telephony area networks such as analog voice networks or digital fiber communications networks; via storage area networks such as Fibre Channel SANS, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing nodes 502. Multiple input/output devices 514 may be present in computing node 502 or may be distributed on various computing nodes 502 of the system 500. In some embodiments, similar input/output devices may be separate from computing node 502 and may interact with one or more computing nodes 502 of the system 500 through a wired or wireless connection, such as over network interface 512.

Those skilled in the art will appreciate that computing system 500 is merely illustrative and is not intended to limit the scope of embodiments. In particular, the computing system 500 may include a combination of hardware or software that can perform the functions disclosed herein, including computers, network devices, internet appliances, PDAs, wireless phones, pagers, etc. Computing node 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed iii other orders and in other manners. The various methods as depicted in the figures and described herein represent illustrative embodiments of methods. The methods may be implemented in software, in hardware, or a combination thereof in various embodiments. Similarly, the order of any method may be changed, and various elements may be added, reordered, combined, omitted, modified, etc., in various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of computing devices configurable to implement a plurality of computing nodes in a provider network, wherein each computing device includes a processor and memory; and
one or more of the computing devices are configured to implement a network address translator (NAT) and a policy manager;
wherein the NAT:
  receives packets wherein the packets include handshake packets that are part of a multipart Transmission Control Protocol (TCP) communication session establishment handshake which target at least one of the computing nodes of the provider network; and
  redirects at least one packet that is part of the multipart TCP communication session establishment handshake to the policy manager rather than to the computing node targeted by the packet; and
wherein the policy manager stores history data of the packets and prevents the redirected packets from being forwarded to a targeted computing node in the provider network to thereby disallow the multipart TCP communication session from being established based at least in part on a comparison of information in a header of the packet as well as the history data, or a value derived from the packets history data, to a set of security policies.

2. The system of claim 1 wherein the one or more of the computing devices are configured to implement a plurality of communication managers which are configured to implement a plurality of virtual networks for providing the packets to be transmitted to or from each of the computing nodes.

3. The system of claim 1:
wherein the one or more of the computing devices are configured to implement a plurality of policy managers; and
wherein the NAT is configured to compute a hash of at least a portion of a packet that is part of the multipart communication session establishment handshake to produce a hash value, to map the hash value to a particular policy manager, and to redirect the packet to that particular policy manager.

4. A system, comprising:
a plurality of computing devices configurable to implement a plurality of computing nodes in a network, wherein each computing device includes a processor and memory; and
one or more of the computing devices are configured to implement a plurality of policy managers, wherein each policy manager:
  receives a communication session establishment handshake packet that is part of a multipart communication session establishment handshake which targets at least one of the computing nodes of the network; and
  prevents the communication session from being established based at least in part on a comparison by the policy manager of information in a header of the communication establishment handshake packet to security policies accessible to the policy manager; and
wherein the one or more of the computing devices are configured to implement a network device that:
  receives packets, wherein the packets include handshake packets that are part of the multipart communication session establishment handshake which targets at least one of the computing nodes of the network; and
  for each packet that is part of the multipart communication session establishment handshake, computes a hash of at least a portion of the packet to produce a hash value, maps the hash value to a particular policy manager, and redirects the packet to that particular policy manager.

5. The system of claim 4, wherein the security policies include a plurality of security policies at least one of which includes a plurality of internet protocol (IP) addresses and causes the particular policy manager to prevent a communication session from being established with respect to computing systems external to the network and/or computing nodes within the network that are addressed with any of the IP addresses in the security policy.

6. The system of claim 5, wherein the packets redirected by the network device include Transmission Control Protocol (TCP) handshake packets to establish a TCP communication session.

7. The system of claim 5 wherein the network device implements at least one of network address translation, packet rate limiting, packet metering, firewalling, and packet filtering.

8. The system of claim 4 wherein the network device is configured to detect packets that are not part of the multipart communication session establishment handshake and forward such packets to the computing nodes targeted by the packets.

9. The system of claim 4:
wherein each policy manager stores history data of the packets and is configured to compare the information in the header as well as the history data, or a value derived from the history data, to the set of security policies and to prevent the redirected packet from being forwarded to the targeted computing node based on the comparison.

10. The system of claim 4, wherein the security policies include a security policy that includes a source IP address and a destination port number which causes the particular policy manager to prevent a communication session from being established that includes the source IP address and destination port number.

11. A method, comprising:
determining whether a communication packet targeting a computing node is a packet of a multi-packet communication session establishment handshake;
computing a hash value of a field in a header of the communication packet that is the packet of the multi-packet communication session establishment handshake;
based on the hash value, forwarding the communication packet that is a packet of the multi-packet communication session establishment handshake to one of a plurality of policy managers, rather than to the computing node;
comparing, by the policy manager that is one of the plurality of policy managers, information in the header of the communication packet to a plurality of security policies;
forwarding, by the policy manager, the communication packet to the targeted computing node based on the information in the header not violating any of the security policies that permit an establishment of a communication session to be completed; and
preventing the communication session from being completed based on the information in the header violating at least one of the security policies that permit the establishment of the communication session to be completed.

12. The method of claim 11, wherein determining whether the communication packet is a packet of a multi-packet communication session establishment handshake includes determining whether the communication packet is a TCP SYN or TCP SYN-ACK packet.

13. The method of claim 11, further comprising:
implementing a virtual network over a physical network; and
wherein forwarding each packet that is a packet of a multi-packet communication session establishment handshake to a policy manager includes forwarding the packet over the virtual network to the policy manager.

14. The method of claim 13 further comprising providing access to the physical network on behalf of customers of a provider network.

15. The method of claim 11, further comprising forwarding each packet that is not a packet of a multi-packet communication session establishment handshake to the computing node, rather than to the policy manager.

16. The method of claim 11, wherein comparing, by the policy manager receiving the communication packet, information in the header of the packet to the plurality of security policies includes comparing the information to a security policy that includes a plurality of internet protocol (IP) addresses, and wherein preventing the communication session from being established includes preventing the communication session from being established based on the source IP address in the packet matching one of the plurality of IP addresses in the security policy.

17. The method of claim 11 further comprising:
storing history data of packets received by the policy manager;
generating a metric indicative of the history data; and
wherein comparing the information in the header of the packet to the security policies includes comparing the information in the header as well as the metric to the security policies.

18. The method of claim 17 wherein the metric includes a packet rate.

* * * * *